3,199,993
SINTERED BODIES BEING RESISTANT TO HEAT, OXIDATION AND WEAR

Nils Gustav Schrewelius, Hallstahammar, Sweden, assignor to Aktiebolaget Kanthal, Hallstahammar, Sweden
No Drawing. Filed Mar. 12, 1959, Ser. No. 798,856
Claims priority, application Sweden, Mar. 13, 1958, 2,459/58
4 Claims. (Cl. 106—55)

The present invention relates to a sintered body being resistant to heat, oxidation and wear and manufactured by compacting and sintering powder mixtures.

The invention is particularly concerned with such sintered bodies which contain silicon boride. In this connection, silicon boride is understood to include chemical compounds or solid solutions, or mixtures of chemical compounds and/or of solid solutions, where any such composition contains exclusively silicon and boron. The possibility of producing such materials containing silicon and boron has been realized for a long time, however up until now they have found no practical application. The compositions of such silicon borides have been stated to be, inter alia, $SiB_3$, $SiB_6$ and $SiB_{12}$. They are characterized by great hardness as well as by a relatively good resistance to chemicals and to oxidation. The most widely known compound is $SiB_3$.

Insofar as the density of $SiB_3$, is 2.6 g./cm.$^3$ and its hardness very high, one would expect that such a silicon boride could find use as an abrasive or as a heat resistant construction material, for example. It has been found, however, that the great brittleness of the material puts obstacles in the way of its practical application. This is true also for other silicon borides having compositions differing from $SiB_3$. The silicon borides concerned in connection with the present invention, are of the general composition $SiB_x$ in which $x$ ranges from 2.5 to 14.

In connection with the present invention it has been found, quite surprisingly, that it is possible to produce in a powder-metallurgical way a sintered body being resistant to heat, oxidation and wear and containing silicon-boride, provided that there is used as a binder, or cementing medium, a pulverulent material evenly distributed in the sintered body and containing silicon and/or boron and, provided the quantity and composition of the binder are determined according to certain rules, it has been found that products are obtainable having sufficient mechanical strength to render the product practical for use for a great variety of purposes.

The sintered body according to the invention is characterized thereby that it consists of 20 to 98% of silicon boride by weight, and 2 to 80% of a binder by weight, said silicon boride having the composition $SiB_x$, where $x$ ranges between 2.5 and 14, and the binder contains silicon and/or boron. The total weight of boron and silicon in the binder constitutes preferably 10 to 80% by weight of the binder. According to a preferred embodiment the liquids temperature of the binder exceeds 1400° C. The silicon boride has preferably the composition $SiB_3$.

The binder according to the invention may be any of a variety of different compositions. Thus, its silicon and/or boron may be chemically bound to one or more metals or non-metals.

As examples of metals may be mentioned the transition metals Ti, Zr, Hf, V, Nb, Ta, Cr, Mo and W, and the compounds of said metals may be silicides and borides respectively, preferably disilicides, such as $MoSi_2$, and silicides with the composition $M_5Si_3$ in which M is one of said metals.

As non-metals may be mentioned C, N, and O, forming carbides, nitrides, and oxides, respectively with the boron and/or silicon of the binder.

A preferred combination of silicon boride and binder is $SiB_3$ and $MoSi_2$, to which may be added colloidal silica. The above-mentioned transition metals may be used in combination with or be replaced by said non-metals, preferably oxygen, carbon or nitrogen. The liquids temperature exceeds preferably 1400° C. and the total quantity of Si+B constitutes 10 to 80% of the weight of the binder. According to an embodiment of the invention a ceramic binder is used having the composition: 20 to 100% $SiO_2$ by weight, 0 to 5% $B_2O_3$, 0 to 80% $Al_2O_3$, and 0 to 10% $Na_2O$ or $K_2O$.

Particularly advantageous binding means have been found to be bron-silicides the compound being $M(Si,B)_2$ or $M_5(Si,B)_3$ in which M is a transition metal. A further binder composition is 15 to 50% Si by weight, 0 to 20% Al, and 50 to 85% Mo by weight, preferably in the form of $MoSi_2$. Alternatively, the binder may consist exclusively of silicon carbide or so called boron carbide. With boron carbide is meant a solid solution with the approximate composition $B_4C$. Also boron nitride (BN) and silicon nitride ($Si_3N_4$) may form or be included in the binder.

It has not been possible to explain with certainty why binders of the types above specified are so useful in sintered bodies of silicon boride. An explanation may be that both silicon boride and the binders according to the invention have a very thin coating of $SiO_2$ and/or $B_2O_3$ which may result in that the two components "wet" one another during sintering whereby this process is facilitated. The function of the binder in the sintered body is before all to prevent the grain growth at high temperature, it being understood that the grain size is of considerable importance both in the silicon boride and in the binder as will be explained below.

Sintered bodies according to the invention which are to be used at high temperature in an oxidizing atmosphere should preferably contain silicon triboride, $SiB_3$. This silicon boride, as a matter of fact, has a particularly high resistance to oxidation which is related to its high silicon content. Owing to the fact that the heat of formation per oxygen atom of $SIO_2$ exceeds that per oxygen atom of $B_2O_3$, solid bodies of silicon triboride, on oxidation at high temperature, will be surrounded by a thin coating of mostly $SiO_2$, whereas, on the other hand, the formation of $B_2O_3$ will be suppressed, which results in a high degree of resistance to oxidation. If the silicon content of the silicon boride is a lower one, such as in the case of a compound having the composition $SiB_{12}$, then the silicon content of the product will be insufficient to ensure the formation of a protective coating of $SiO_2$. It is possible, however, to attain improved resistance to oxidation by using as binders heat resistant silicides of a high silicon content, such as $MoSi_2$. Combinations of silicon triboride and $MoSi_2$, for example, show sufficiently good characteristics to enable them to be used in an oxidizing atmosphere at temperatures as high as 1600° C.

Sintered bodies according to the invention are prepared by compacting and sintering pulverulent mixtures in a suitable atmosphere or under pressure, such as in a graphite mold. Such sintering conditions as pressure, time, temperature and nature of the atmosphere will depend to a large extent on the composition of the powder mixture and, therefore, cannot be stated generally.

The particle sizes of the raw materials concerned should preferably be very small, such as less than 40 microns and preferably less than 10 microns. It is often preferred to use silicon boride and binder with still less grain size, such as less than 6 microns. In order cases the grain sizes of the starting material may be selected according to two or more specified grain fractions with a view that grains of different sizes are combined to produce an volume weight as high as possible. This is often preferable in the case of silicon carbide. If a ceramic binder is used, it may, to advantage, be admixed in a colloidal condition, such as in the form of hydrated silicon dioxide or clay.

Heat resistant silicides or borides will be admixed either in the form of pre-reacted powders, or in the nature of the various components, such as molybdenum powder and silicon powder. It is possible also to admix the binder in the form of powdered metal, provided that the sintering is carried out in a manner to cause the metal powder to react with a part of the silicon boride while forming metal silicides and/or metal borides. Instead of adding a powder of a single metal it is possible to add a pulverulent mixture of several metals or an alloy powder. During sintering this metallic addition will take up silicon and/or boron. Also one or more oxides, such a aluminium oxide, may be added. The sintering is then carried out so that the silicon boride is oxidized, the silica then reacting with oxide addition and forming, for instance, aluminium silicate, at least in a boundary layer between the oxide grains and the silicon boride grains.

In another embodiment the silicon boride powder may be sintered in an oxidizing atmosphere to form silicon dioxide and/or boron oxide in situ. The latter may constitute the sole binder or may react with added binder materials.

Silicon boride reacts at a very high temperature with most substances which must be noted in the manufacture of sintered bodies according to the invention. To cause that only a controlled fraction of the silicon boride is then dissolved in the binder quite short sintering times might be used, for instance, by pressure sintering. The sintering is preferably carried out in two steps, i.e., first a presintering in a protective atmosphere and then a secondary sintering in an oxidizing atmosphere, for instance, as described in the British Patent 791,324.

The silicon borides are preferably prepared separately by the employment of melt-metallurgical or powder-metallurgical processing techniques. According to the powder matellurgical process mixtures of silicon powder and boron powder are sintered, if desired, under presure at high tempeature, for instance in a graphite mold at 1700° C. The melt-metallurgical process of production is carried out, by way of example, by reduction of a suitable mixture of boron, silicon, boric acid and/or silicon dioxide with magnesium powder, and subsequent leaching out magnesium oxide formed by an acid. If Al is used as a reduction means instead of Mg the aluminium oxide formed is allowed to remain as a component and care is preferably taken that the reaction heat is insufficient to melt the reaction products. In this way an even distribution of fine grains of silicon boride and oxide is obtained. In addition to $Al_2O_3$ this oxide contains also $B_2O_3$ and $SiO_2$ whereby a better sintering together between the silicon boride and the oxide may be obtained at a later stage. A few methods of producing sintered bodies according to the invention will appear from the following examples of its carrying into effect.

*Example 1*

In a ball mill with sintered hard metal balls, a charge consisting of 25 parts by weight of molten $SiB_3$ and 70 parts by weight of $MoSi_2$ is ground in gasolene for 4 days into a particle size of 1 to 6 microns. The powder mixture has then admixed to it a plasticizer in the form of a colloidal hydrated silicon dioxide in an amount corresponding to 5 parts by weight of $SiO_2$, and is finally extruded. The extruded compacts are subsequently sintered for 20 minutes in hydrogen at 1300° C. and then in air under oxidation at 1550° C. for 5 minutes by passing electric current directly therethrough. The sintered bodies thus obtained consist of 23% $SiB_3$, 68% $MoSi_2$ and 9% of a balance containing $SiO_2$ and molybdenum boride. The bodies are oxidation resistant at temperatures up to 1600° C. and are suitable for use as electric resistance elements at high temperatures, particularly as supply conductors to incadescent zones.

*Example 2*

75 parts by weight of silicon boride of a grain size of 10 to 40 microns and of the approximate composition $SiB_{12}$ are mixed with 25 parts by weight of bentonite having a particle size less than 1 micron.

The mixture is compacted into blocks weighing about 1 kg., and these are then sintered for 10 minutes in hydrogen at 1600° C. The product thus obtained consists of 75% silicon boride and 25% of an oxide component containing 35% Si. It is crushed and screened, whereupon the particle-size fraction ranging from 3 to 0.5 mm. is removed. These particles may, to advantage, be used as an abrasive in the production of ceramically bound grinding wheels which can be calcined in an oxidizing atmosphere at 1500° C. without destruction of the abrasive grains by oxidation.

*Example 3*

A sintered body resistant to grinding is manufactured by pressure sintering for 1 minute in a graphite mold at 1700° C. under a pressure of 180 kg./cm.$^2$ a mixture sisting of 70% by weight of silicon boride having grain sizes of 1 to 5 microns and the approximate composition $SiB_{5.2}$ and, further, 25% of $B_4C$ by weight, having grain sizes of 3 to 8 microns and, still further, 5% of carbonyl nickel powder.

*Example 4*

A refractory sintered body is prepared by sintering at 2050° C. in a CO atmosphere of a mixture consisting of equal parts by weight of SiC with particle sizes of 10 to 200 microns and of silicon boride of the approximate composition $SiB_6$ and grain sizes of 3 to 8 microns. After sintering the composition is 45% silicon boride and the balance binder containing SiC and $B_4C$.

*Example 5*

A heat resistant sintered body suitable for different structural parts is prepared by pressure sintering at 1600° C. during 2 minutes at a pressure of 200 kg./cm.$^2$ of a mixture containing 30% $TiB_2$ by weight, 50% $SiB_3$ and 20% $TiSi_2$. The final product will consist of 50% $SiB_3$ and binder containing 20% B, 20% Si and 60% Ti.

*Example 6*

A mixture of 56 grams Si, 181 grams $B_2O_3$ and 190 grams Al is heated in hydrogen, an exothermic reaction then taking place and $SiB_3$ and $Al_2O_3$ are formed. The reaction product is crushed and leached for 30 minutes in HCl in a concentration of 10% to remove the excess of aluminium. The powder is washed, dried and ground in gasoline in a ball mill to a grain fraction of 5 to 8 microns whereupon the gasolene is removed and the powder mixed with a bentonite slurry consisting of 40 grams of bentonite and 240 grams of water. After a certain drying to obtain a plastic mass this is extruded, dried and sintered in $H_2$ at 1600° C. during 15 minutes. The composition of the sintered bodies obtained is 22% $SiB_3$ and 78% oxide mixture the latter consisting of 15% $SiO_2$, 3% $B_2O_3$, 80% $Al_2O_3$ and 2% impurities, such as $Fe_2O_3$, CaO etcetera.

The invention is not restricted to the use of silicon borides of certain definite molecular compositions such as those stated in the examples here given, since such compounds would not exist as stable substances, with a few exceptions, such as in the case of $SiB_3$. Therefore, the scope of the invention should also include compositions having continuous transitions between the molecular compositions stated in the examples, thus, as stated hereinbefore, having an $x$-value ranging from 2.5 to 14 in the formula $SiB_x$.

Among possible applications, the following may be mentioned by way of example: refractory bodies in the form of bricks, muffles, furnace parts, special molds in or associated with furnaces and other high-temperature apparatus. In addition, the sintered bodies may find application as a corrosion resistant lining material for rockets and jet propulsion engines, as combustion nozzles, and as turbine blading for jet propulsion engines. Further applications for the bodies are as laboratory utensils, such as combustion cups or boats, melting crucibles, burner nozzles, and as grinding balls for ball mills, and in chemical-industrial apparatus of various kinds. A still further field of application is that of abrasives, such as grinding wheels and abrasive powder, and for cutting tools and wire drawing dies. Finally, it may find application also in the field of electro-techniques, for instance as heater bodies for radio and X-ray tubes, for radar equipment, as thermo-element material and as sheathing sleeves for thermocopules, and in electric resistance elements, particularly for electric heating purposes. A particularly advantageous field of application is in such heating elements which operate at a very high temperature in air. The material of the incandescent zone may then be $MoSi_2$ or SiC but for special reasons it is desirable to use a different material in the supply leads. By using for this purpose sintered bodies according to the invention supply leads are obtained with high electric conductivity, high resistivity against oxidation attacks, low specific gravity and low cost of material.

What is claimed is:

1. A sintered body resistant to heat, oxidation and wear, said body consisting of 20–98% by weight of silicon boride and 2–80% of a binder, said silicon boride having the composition $SiB_x$ where $x$ ranges between 2.5 and 14, and the binder being a member of the group consisting of boron oxide and silicon oxide.

2. A sintered body resistant to heat, oxidation and wear, said body consisting of 20–98% by weight of silicon boride and 2–80% of a binder, said silicon boride having the composition $SiB_x$ where $x$ ranges between 2.5 and 14, and wherein the binder is a ceramic and has the following composition: 20 to 100% $SiO_2$ by weight, 0 to 5% $B_2O_3$, 0 to 80% $Al_2O_3$, and 0 to 10% of a member of the group consisting of $Na_2O$ and $K_2O$.

3. A sintered body resistant to heat, oxidation and wear, said body consisting of 20–98% by weight of silicon boride and 2–80% of a binder, the silicon boride having the composition $SiB_x$ where $x$ ranges between 2.5 and 14, and the binder being a composition which consists of silicon and boron and carbon.

4. A process of manufacturing a sintered body wherein a pulverulent mixture consisting of silicon boride is sintered in an oxidizing atmosphere to form in situ at least one member of the group consisting of silicon dioxide and boron oxide, wherein 20 to 98% of the weight of the sintered body consists of silicon boride of the composition $SiB_x$ in which $x$ is 2.5 to 14.

References Cited by the Examiner

UNITED STATES PATENTS

| 2,802,748 | 8/57 | Glaser | 106—55 |
| 2,814,566 | 11/57 | Glaser | 106—43 |
| 3,036,017 | 5/62 | Schrewelius | 106—57 |

FOREIGN PATENTS

| 478,016 | 1/38 | Great Britain. |

OTHER REFERENCES

Mellor, Comprehensive Treatise on Inorganic and Theoretical Chemistry, vol. 5, page 27.

TOBIAS E. LEVOW, *Primary Examiner.*

JOSEPH REBOLD, JOHN R. SPECK, *Examiners.*